(12) United States Patent
Liu et al.

(10) Patent No.: US 10,787,546 B2
(45) Date of Patent: Sep. 29, 2020

(54) ALIPHATIC POLYESTER RESIN POWDER SUITABLE FOR SELECTIVE LASER SINTERING AND ITS PREPARATION METHOD

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Jianye Liu, Beijing (CN); Liqiu Chu, Beijing (CN); Yun Lyu, Beijing (CN); Shijun Zhang, Beijing (CN); Liying Zhang, Beijing (CN); Hao Zou, Beijing (CN); Mu Dong, Beijing (CN); Dali Gao, Beijing (CN); Baige Chou, Beijing (CN); Yiqing Bai, Beijing (CN); Jingbo Shao, Beijing (CN); Meng Xu, Beijing (CN); Yihui Xu, Beijing (CN); Ruoshi Chen, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 248 days.

(21) Appl. No.: 15/953,062

(22) Filed: Apr. 13, 2018

(65) Prior Publication Data

US 2018/0230274 A1    Aug. 16, 2018

Related U.S. Application Data

(63) Continuation-in-part of application No. PCT/CN2016/079855, filed on Apr. 21, 2016.

(30) Foreign Application Priority Data

Oct. 13, 2015  (CN) .......................... 2015 1 0670526

(51) Int. Cl.
| | | |
|---|---|---|
| *C08J 3/14* | (2006.01) | |
| *B29C 67/00* | (2017.01) | |
| *C08L 67/04* | (2006.01) | |
| *C08J 3/21* | (2006.01) | |
| *C08G 63/88* | (2006.01) | |
| *B33Y 10/00* | (2015.01) | |
| *B33Y 70/00* | (2020.01) | |
| *B29C 64/153* | (2017.01) | |
| *C08G 63/08* | (2006.01) | |
| *C08G 63/12* | (2006.01) | |
| *C08J 3/09* | (2006.01) | |
| *C08J 3/11* | (2006.01) | |
| *B29K 67/00* | (2006.01) | |

(52) U.S. Cl.
CPC .............. *C08J 3/14* (2013.01); *B29C 64/153* (2017.08); *B29C 67/00* (2013.01); *B33Y 10/00* (2014.12); *B33Y 70/00* (2014.12); *C08G 63/08* (2013.01); *C08G 63/12* (2013.01); *C08G 63/88* (2013.01); *C08J 3/095* (2013.01); *C08J 3/11* (2013.01); *C08J 3/212* (2013.01); *C08L 67/04* (2013.01); *B29K 2067/00* (2013.01); *B29K 2995/0041* (2013.01); *C08J 2367/02* (2013.01); *C08J 2367/04* (2013.01)

(58) Field of Classification Search
USPC ................................. 528/490, 491, 492, 493
See application file for complete search history.

(56) References Cited

U.S. PATENT DOCUMENTS

2013/0131209 A1    5/2013 Yamane et al.

FOREIGN PATENT DOCUMENTS

| | | |
|---|---|---|
| CN | 1856534 A | 11/2006 |
| CN | 102140246 A | 8/2011 |
| CN | 101138651 B | 4/2012 |
| CN | 103374223 A | 10/2013 |
| CN | 103509197 A | 1/2014 |
| CN | 103509198 A | 1/2014 |
| CN | 102399371 B | 11/2015 |
| CN | 105585720 A | 5/2016 |
| WO | 2001068890 A2 | 9/2001 |

*Primary Examiner* — Terressa Boykin
(74) *Attorney, Agent, or Firm* — Novick, Kim & Lee, PLLC; Allen Xue

(57) ABSTRACT

A method for preparing an aliphatic polyester resin powder includes the steps of
a) heat dissolving a crystalline aliphatic polyester resin in an organic solvent to obtain an aliphatic polyester resin solution;
b) cooling the aliphatic polyester resin solution to precipitate a solid, thereby obtaining a solid-liquid mixture;
c) optionally adding an adjuvant to the solid-liquid mixture and mixing; and
d) conducting solid-liquid separation and drying to obtain an aliphatic polyester resin powder suitable for selective laser sintering.
The crystalline aliphatic polyester resin powder obtained has good antioxidant property, good powder flowability, moderate size, smooth surface, suitable bulk density, and suitable dispersibility and particle size distribution. The aliphatic polyester resin powder is particularly suitable for selective laser sintering method.

30 Claims, 2 Drawing Sheets

ALIPHATIC POLYESTER RESIN POWDER SUITABLE FOR SELECTIVE LASER SINTERING AND ITS PREPARATION METHOD

TECHNICAL FIELD

The present invention relates to the technical field of polymer processing, in particular to a method for preparing an aliphatic polyester resin powder and an aliphatic polyester resin powder obtained thereby and its use for selective laser sintering.

BACKGROUND ART

Selective Laser Sintering (SLS) technology is a rapid molding technology. It is currently most widely applicable and is the most promising technology in additive manufacturing technology showing in recent years a rapid development trend. The SLS technology is a method in which a computer first scans a three-dimensional solid article, and then high-strength laser light is used to irradiate material powders pre-spreading on a workbench or a component, and selectively melt-sinter it layer-by-layer, thereby realizing a layer-by-layer molding technology. The SLS technology has a high degree of design flexibility, is capable of producing accurate models and prototypes, and is capable of molding components that have reliable structure and can be used directly. Moreover, it shortens the production cycle and simplifies the process, so that it is particularly suitable for the development of new products.

Theoretically, the types of molding materials that can be used for the SLS technology are relatively extensive, such as polymers, paraffins, metals, ceramics, and their composites. However, the performances and properties of molding materials are one of the essential factors to successful sintering of the SLS technology, because they directly affect the molding speed, precision, physical and chemical properties and overall performance of molded parts. Currently, the polymer powdery raw materials that can be directly applied to the SLS technology for successfully manufacturing molded products with small dimensional deviations, good surface regularity, and low porosity are rarely seen in the market. Therefore, it is urgent to develop and improve the polymer types applicable to the SLS technology and their corresponding solid powdery raw materials.

In the prior art, a pulverization method such as a cryogenic pulverization method is generally used to prepare powdery raw materials suitable for the SLS. For example, polypropylene powders obtained by cryogenic pulverization method is disclosed in CN104031319A. However, on one hand, this method requires a specific equipment. On the other hand, the surface of the prepared powdery raw material particle is rough, the particle size is not uniform enough, and the shape is irregular, which is not conducive to the formation of sintered molded body and affects the performance of the molded body.

In addition, a precipitation method may be used to prepare polymer powdery raw materials, such as polyamide powders. In this method, the polyamide is usually dissolved in a suitable solvent, uniformly dispersed in the solvent by stirring, and then the powders are precipitated upon cooling. For example, CN103374223A discloses a precipitation polymer powder based on an AABB-type polyamide, which is obtained by reprecipitating a polyamide formed by polycondensation of a diamine and a dicarboxylic acid. In the method described in this patent, alcoholic solvents are used during reprecipitation.

In addition, CN101138651A discloses a method for manufacturing a tissue scaffold by selective laser sintering using polymer microspheres, in which a precipitation method is used to produce the polymer microspheres. In this preparation method, a polymer material such as polylactic acid and polyhydroxybutyrate is first dissolved in a solvent. In a further embodiment, mention is made of, for example, dissolving poly-L-lactic acid in methylene chloride without heating and dissolving amorphous poly-DL-lactic acid in its good solvent acetone to form a stable solution without precipitation of polylactic acid crystals. This patent document does not focus on how to specifically select the solvent that dissolves the polymer material.

CN103509197A discloses a method for preparing polylactic acid microparticles, which comprises dissolving polylactic acid and a water-soluble polymer at 80-140° C. with a solvent, and then precipitating polylactic acid microparticles with a precipitating agent upon cooling. The solvent is selected from the group consisting of high boiling ethers and amides.

SUMMARY OF THE INVENTION

A first aspect of the present invention is to provide a method for preparing an aliphatic polyester resin powder. Aliphatic polyester is a type of polymer material with a wide range of applications and good biodegradability. It has a good comprehensive performance meeting the requirements on food contact and environmental protection. Therefore, the development of an aliphatic polyester solid powder for the SLS can satisfy needs for personalized product applications. The aliphatic polyester resin powder provided according to the present invention has moderate size, suitable bulk density, a uniform particle shape, a uniform particle size distribution, and good powder flowability, and is particularly suitable for selective laser sintering to prepare various molded products.

The method for preparing an aliphatic polyester resin powder according to the present invention includes the following steps:
a) heat dissolving a crystalline aliphatic polyester resin in an organic solvent to obtain an aliphatic polyester resin solution;
b) cooling the aliphatic polyester resin solution to precipitate a solid, thereby obtaining a solid-liquid mixture;
c) optionally adding an adjuvant to the solid-liquid mixture and mixing;
d) conducting solid-liquid separation and drying to obtain an aliphatic polyester resin powder suitable for selective laser sintering;
wherein, the organic solvent is selected from ketones or cyclic ethers and satisfies:
(1) the solubility parameter is in the range of 10.0-25.0 $MPa^{0.5}$, preferably 14.5-23.0 $MPa^{0.5}$, more preferably 18.5-20.5 $MPa^{0.5}$, and
(2) the boiling point is not higher than 160° C., for example, not higher than 150° C. or 130° C. or 100° C., at normal pressure.

A second aspect of the present invention relates to an aliphatic polyester resin powder obtained according to the method of the present invention.

A third aspect of the present invention relates to a selective laser sintering method.

A fourth aspect of the present invention relates to use of an aliphatic polyester resin powder obtained according to the method of the present invention in a method of producing a three-dimensional object.

DETAILED DESCRIPTION OF THE INVENTION

In the preparation method of the aliphatic polyester resin powder according to the present invention, the aliphatic polyester resin is generally understood as a generic name of a type of polymer materials having an ester group in the main chain of the polymer, and it is a crystalline type. It can be produced, for example, by direct condensation of an aliphatic dicarboxylic acid with a diol, transesterification of an aliphatic dicarboxylic acid ester with a diol, and ring-opening polymerization of a lactone. These methods are known to those skilled in the art.

Preferably, the crystalline aliphatic polyesters suitable for the present invention may be selected from the group consisting of polyesters formed by $C_4$-$C_{12}$ aliphatic dicarboxylic acids and $C_2$-$C_{10}$ aliphatic diols, polyesters formed by alpha-hydroxy $C_2$-$C_6$ carboxylic acids or polycaprolactone. In particular, the aliphatic polyester is at least one selected from the group consisting of crystalline polylactic acid, polyglycolide, poly(DL-lactide-co-glycolide), polyethylene succinate, polybutylene succinate, polybutylene adipate, polybutylene succinate/adipate copolymer, and polycaprolactone. Preferably, the aliphatic polyester resin is crystalline polylactic acid.

In an advantageous embodiment, the crystalline polylactic acid resin suitable for use as the aliphatic polyester of the present invention is in particular L-polylactic acid resin or D-polylactic acid resin or a mixture of both in any weight ratio, preferably a mixture of both in a weight ratio of about 1:1. In addition, according to a preferred embodiment of the present invention, the L-polylactic acid resin and the D-polylactic acid resin have an optical purity of ≥92%, and a melt index, measured at 190° C. and a load of 2.16 kg, of 20-100 g/10 min, preferably 30-80 g/10 min. The polylactic acid resin having an optical purity of ≥92% exhibits a significantly better crystallization ability, and the polylactic acid resin having a melt index within the above range exhibits a good flowability after melting, as is advantageous to the laser sintering process.

Although organic solvent precipitation technology has been used for separation and purification of biochemical substances, especially protein, or for precipitation to prepare crystals, there are currently few reports on the preparation of resin powdery material using organic solvent precipitation method, particularly crystalline aliphatic polyester resin powders, which can be used for selective laser sintering. In the method according to the present invention, it is important to select out the organic solvent for dissolving the aliphatic polyester resin which should be a poor solvent for the aforementioned crystalline aliphatic polyester resin under normal temperature and normal pressure. The so-called poor solvent should mean a solvent that does not allow the crystalline aliphatic polyester resin to form a stable solution at room temperature (i.e., no solid precipitates when left standing for more than 10 minutes).

Specifically, the organic solvent is selected to be a ketone or cyclic ether solvent having a solubility parameter in the range of 10.0-25.0 $MPa^{0.5}$, preferably 14.5-23.0 $MPa^{0.5}$, more preferably 18.5-20.5 $MPa^{0.5}$, and the solvent is selected to be a low boiling solvent. In the context of the present invention, the term "low boiling point" means that the solvent has a boiling point of no more than 160° C., such as no more than 150° C. or 130° C. or 100° C., at normal pressure.

Preferably, in step a), the organic solvent is used in an amount of 600-1200 parts by weight, preferably 800-1000 parts by weight, based on 100 parts by weight of the aliphatic polyester resin. When the amount of the organic solvent is within this range, an aliphatic polyester resin powder having good morphology and dispersibility can be obtained.

In an advantageous embodiment, the organic solvent is selected from $C_3$-$C_{10}$ ketone solvents or $C_3$-$C_{10}$ cyclic ether solvents, preferably $C_3$-$C_5$ ketone solvents or $C_3$-$C_5$ cyclic ether solvents, more preferably at least one selected from the group consisting of acetone, butanone, 2-pentanone, 3-pentanone, cyclopentanone, methylisopropyl ketone, tetrahydrofuran, dioxane, and dioxolane.

In a more preferred embodiment, the organic solvent is selected from acetone and/or butanone.

The inventors of the present invention have further found through extensive experiments that when using the above organic solvents, particularly acetone and/or butanone, to dissolve the crystalline aliphatic polyester resin and cooling to precipitate, the crystalline aliphatic polyester resin can precipitate in a spherical and/or spheroidal shape with a particle size of 25-130 μm. The obtained aliphatic polyester resin powder has smooth surface, good dispersibility and small size distribution, and is particularly suitable for selective laser sintering technology.

In step a) of the method according to the present invention, the heating temperature depends on the melting points of various crystalline aliphatic polyesters. For example, the aliphatic polyester resin can be advantageously heated to a temperature of 60-200° C., e.g. 70-190° C. or 80-160° C. In a specific embodiment, crystalline polylactic acid, polyglycolide and poly(DL-lactide-co-glycolide) can be heated to 100-180° C., preferably 110-150° C., more preferably 120-140° C. In another specific embodiment, polyethylene succinate and polybutylene succinate are heated to 70-150° C., preferably 80-120° C., more preferably 90-110° C. In a further specific embodiment, polybutylene adipate, polybutylene succinate/adipate copolymer and polycaprolactone are heated to 60-120° C., preferably 60-90° C., more preferably 60-80° C.

In a preferred embodiment, the aliphatic polyester resin solution may be held at said heating temperature for 30-90 minutes for sufficient dissolution. In addition, it is also preferable to perform the heating under an inert gas which is preferably nitrogen and which pressure may be 0.1-0.5 MPa, preferably 0.2-0.3 MPa.

In the method according to the present invention, the dissolution of step a) and the reprecipitation of step b) are advantageously carried out under pressure. The pressure can be established by vapor pressure of a solvent in a closed system.

In addition, a nucleating agent may optionally be added in step a). Said nucleating agent is at least one selected from the group consisting of silica, calcium oxide, calcium carbonate, barium sulfate, hydrotalcite, talc, carbon black, kaolin and mica. When these nucleating agents are added, the crystallization rate of the aliphatic polyester resin can be increased, and the surface smoothness, heat resistance and mechanical properties of the obtained polyester resin powder can be improved. Particularly in the case where the aliphatic polyester resin is a crystalline polylactic acid resin, more preferably in the case where the aliphatic polyester resin is a mixture of L-polylactic acid resin and D-polylactic acid resin as described above, a nucleating agent is added. The nucleating agent may be used in an amount of 0.01-2 parts by weight, preferably 0.05-1 parts by weight, and more preferably 0.1-0.5 parts by weight, based on 100 parts by weight of the crystalline aliphatic polyester resin. The nucleating agent is particularly preferably silica and/or talc.

In step b), preferably, the average cooling rate is 0.1° C./min to 1° C./min. In addition, the aliphatic polyester resin solution is preferably cooled down to a target temperature at which said resin solution is held for 30-90 minutes, wherein the target temperature is preferably 10-30° C., for example, room temperature (i.e., about 25° C.).

The cooling of the aliphatic polyester resin solution can be performed at a uniform rate in one step, or it can be performed in a stepwise manner. In a preferred embodiment of step b), the aliphatic polyester resin solution is cooled to the target temperature via one or more intermediate temperatures and held at said intermediate temperatures for 30-90 minutes, said intermediate temperatures being in the range of 40-100° C., for example, 50-90° C. For example, for crystalline polylactic acid, polyglycolide, poly(DL-lactide-co-glycolide), the intermediate temperature is preferably 70-100° C., more preferably 80-90° C.; for polyethylene succinate and polybutylene succinate, the intermediate temperature is preferably 50-80° C., more preferably 60-70° C. This will bring out a better precipitation effect. When two or more intermediate temperatures are used, it is advantageous to make the difference between two adjacent intermediate temperatures above 10° C. It is easily understood that the intermediate temperature refers to the temperature between the heating temperature of step a) and the target temperature of step b).

For example, in a specific embodiment, the crystalline polylactic acid resin solution can be cooled from a heating temperature of 130° C. to 90° C. and held at 90° C. for 60 minutes; or directly cooled down to the room temperature. In another preferred embodiment, if the crystalline polylactic acid resin solution is cooled from a heating temperature to 80-90° C. and held at this temperature for 30-90 minutes, a better precipitation effect can be obtained. With the heating and cooling manners of the present invention, powder particles having a uniform particle size distribution can be obtained, which thus are particularly suitable for selective laser sintering applications.

In addition, in step c) of the method according to the present invention, one or more adjuvants may optionally be added to the solid-liquid mixture. These adjuvants are known in the processing of aliphatic polyester resins and, particularly include powder release agents, antioxidants, antistatic agents, antibacterial agents and/or glass fiber reinforcements.

The antioxidant may be selected from antioxidant 1010 and/or antioxidant 168, preferably a combination of both. More preferably, the antioxidant is used in an amount of 0.1-0.5 parts by weight, preferably 0.2-0.4 parts by weight, based on 100 parts by weight of the crystalline aliphatic polyester resin.

The powder release agent may be a metallic soap, i.e., an alkali or alkaline earth metal based on alkane monocarboxylic or dimer acids, preferably at least one selected from the group consisting of sodium stearate, potassium stearate, zinc stearate, calcium stearate and lead stearate. In addition, the powder release agent may also be a nano-oxide and/or a nano-metal salt, preferably at least one selected from the group consisting of silica, titanium dioxide, aluminum oxide, zinc oxide, zirconium oxide, calcium carbonate and barium sulfate nanoparticles.

In the present invention, the powder release agent is used in an amount of 0.01-10 parts by weight, preferably 0.1-5 parts by weight, and preferably 0.5-1 parts by weight, based on 100 parts by weight of the crystalline aliphatic polyester resin.

The powder release agent can be used to prevent adhesion among the aliphatic polyester resin powder particles, thereby conducive to the processability thereof. On the other hand, it is also possible to prevent adhesion of antioxidants and make them more uniformly dispersed in the aliphatic polyester resin to exert its antioxidant function. Further, the powder release agent can also act synergistically with antioxidants, and thus in particular, aliphatic polyester resin powder with good dispersibility and flowability, which is suitable for selective laser sintering, can be obtained.

The antistatic agent is at least one selected from the group consisting of carbon black, graphite, graphene, carbon nanotubes, and conductive metal powders/fibers and metal oxides, and is preferably at least one selected from the group consisting of acetylene black, superconductive carbon black, special conductive carbon black, natural graphite, expandable graphite, single-walled carbon nanotubes, multi-walled carbon nanotubes, gold, silver, copper, iron, aluminum, nickel or stainless steel component-containing metal powder/fibers, alloy powder/fibers, composite powder/fibers, titanium oxide, zinc oxide, tin oxide, indium oxide and cadmium oxide.

In the present invention, the antistatic agent may be used in an amount of 0.05-15 parts by weight, preferably 0.1-10 parts by weight, and more preferably 0.25-5 parts by weight, based on 100 parts by weight of the crystalline aliphatic polyester resin.

The antistatic agent can be used to impart excellent antistatic performance to selective laser sintered aliphatic polyester products, and in the meantime reduce the electrostatic interaction among the aliphatic polyester resin powder particles and between the aliphatic polyester resin powder particles and the device, thereby improving the processability thereof. Furthermore, the powdery antistatic agent may also serve as a barrier to improve the dispersibility and flowability among the aliphatic polyester resin powder particles.

The antibacterial agent is at least one selected from the group consisting of inorganic antibacterial agents such as supported types, nanometals and metal oxides and/or organic antibacterial agents such as organic guanidines, quaternary ammonium salts, phenol ethers, pyridines, imidazoles, isothiazolinones, and organometals, preferably at least one selected from the group consisting of zeolites, zirconium phosphate, calcium phosphate, hydroxyapatite, supported antimicrobial agents such as glass or activated carbon-supported silver ions, zinc ions or copper ions, nanogold or nanosilver, zinc oxide or titanium dioxide and polyhexamethylene guanidine hydrochloride or polyhexamethylene guanidine phosphate.

In the present invention, the antibacterial agent may be used in an amount of 0.05-1.5 parts by weight, preferably 0.05-1.0 parts by weight, more preferably 0.1-0.5 parts by weight, based on 100 parts by weight of the crystalline aliphatic polyester resin.

The antibacterial agent can be used to impart excellent antibacterial properties to selective laser sintered aliphatic polyester products, and improve the hygienic safety of aliphatic polyester products. Furthermore, when the antibacterial agent is an inorganic powder, it can serve as an auxiliary barrier for the aliphatic polyester resin powder to improve dispersibility and flowability.

The glass fiber reinforcement is a glass fiber having a diameter of 5-20 μm and a length of 100-500 μm. It is preferably an alkali-free ultra-short glass fiber having a diameter of 5-15 μm and a length of 100-250 μm. In the present invention, the glass fiber reinforcement may be used in an amount of 5-60 parts by weight, preferably 5-50 parts by weight, and more preferably 10-50 parts by weight, based on 100 parts by weight of the crystalline aliphatic polyester resin.

The glass fiber added can effectively improve the physical and mechanical properties of aliphatic polyester products. Meanwhile, due to a greater thermal shrinkage of aliphatic polyesters, the glass fiber added also contributes to the dimensional stability of aliphatic polyester products.

A second aspect of the present invention relates to crystalline aliphatic polyester resin powders obtained according to the method of the present invention, the powder particles being spherical and/or spheroidal and having smooth surface, good dispersion and flowability, a uniform particle size distribution and suitable bulk density. Preferably, the aliphatic polyester resin powder particles have a particle size of 25-150 μm, and a particle size distribution D10=24-64 μm, D50=48-95 μm, and D90=71-128 μm. The aliphatic polyester resin powder provided according to the present invention is particularly suitable for selective laser sintering technology with a high success rate of sintering, and the obtained sintered product is featured with a small dimensional deviation from a predetermined product, less cross-sectional holes, a well-proportioned shape, and good mechanical properties.

In addition, a third aspect of the present invention is to provide a selective laser sintering method, in which a crystalline aliphatic polyester resin powder prepared by the method described above is used as a powdery raw material for sintering. According to the selective laser sintering method provided by the present invention, an aliphatic polyester molded product having a regular shape, a well-proportioned and smooth surface, and good mechanical properties can be prepared.

Finally, a fourth aspect of the present invention relates to use of the crystalline aliphatic polyester resin powders obtained according to the method of the present invention in a method of manufacturing a three-dimensional object, in particular a method in which a three-dimensional object is manufactured using selective laser sintering.

MODE OF CARRYING OUT THE INVENTION

Figure 1:
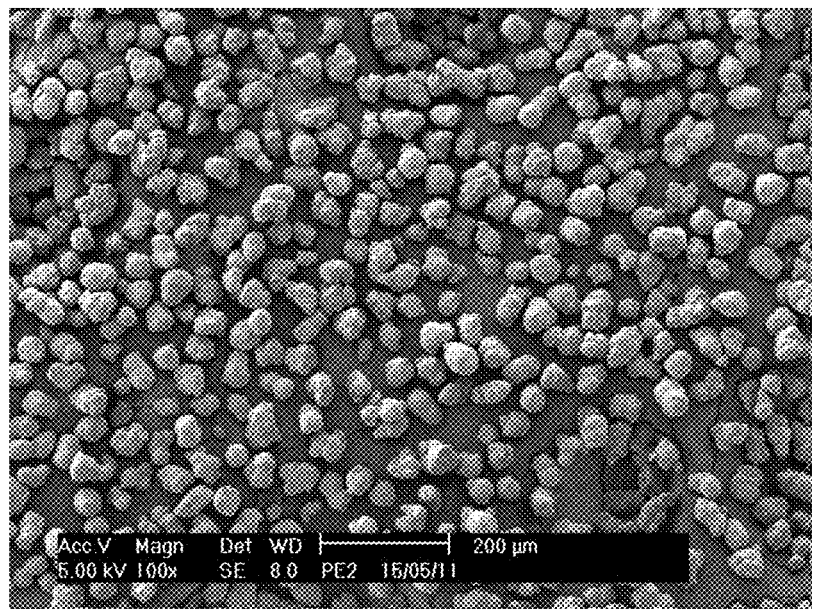
FIG. 1 is a scanning electron microscope (SEM) image of a poly-L-lactic acid resin powder provided according to Example 1 of the present invention.
Figure 2:
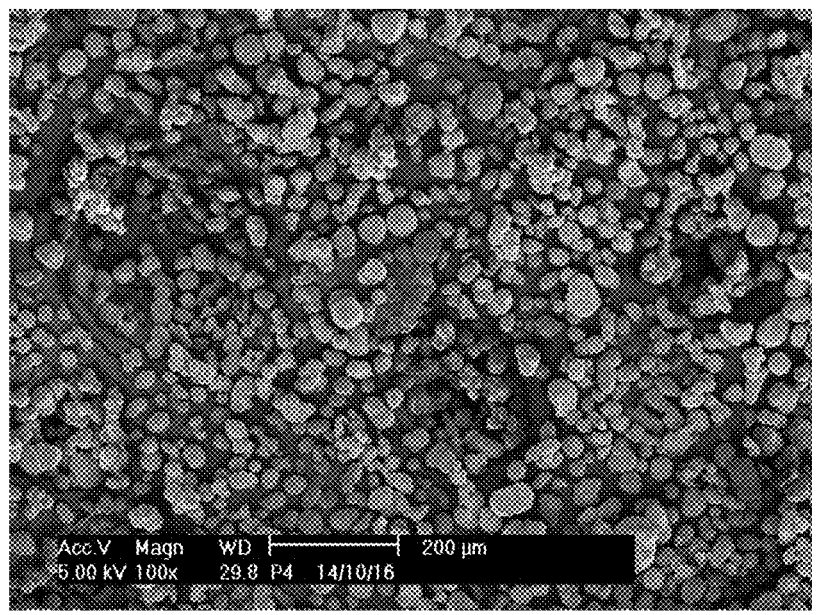
FIG. 2 is a scanning electron microscope (SEM) image of a polylactic acid resin powder provided according to Example 3 of the present invention.
Figure 3:
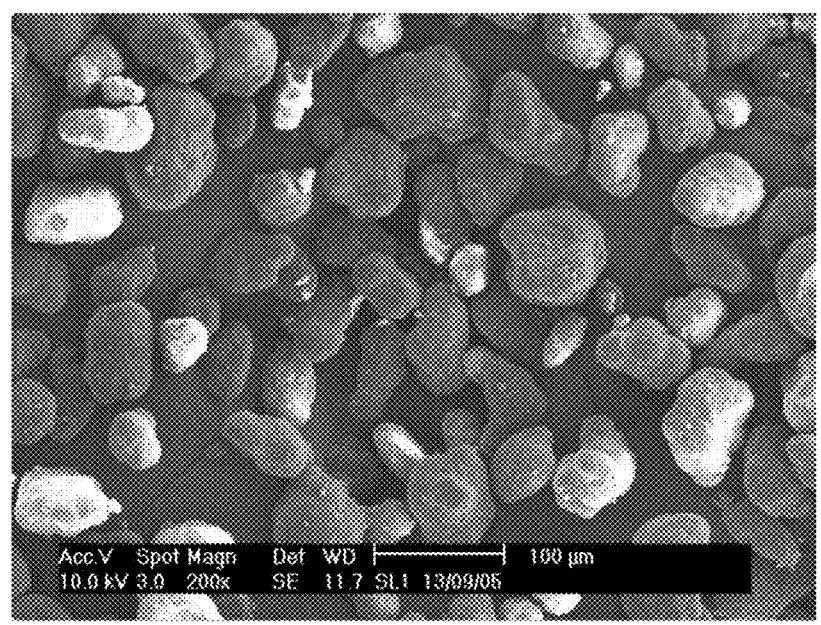
FIG. 3 is a scanning electron microscope image of commercially available polyamide 12 powder for selective laser sintering which is prepared by reprecipitation, for comparison with the present invention (FIGS. 1 and 2).

The present invention will be further illustrated by the following specific examples, but it should be understood that the scope of the present invention is not limited thereto.

In the following examples, the particle size and particle size distribution of the obtained aliphatic polyester resin powders were characterized using a laser particle size analyzer (Mastersizer 2000, Malvern, UK).

Example 1

100 parts by weight of poly-L-lactic acid resin and 1000 parts by weight of acetone were placed in an autoclave. A high-purity nitrogen gas was charged to 0.2 MPa; then the autoclave was heated up to 120° C., and kept at this temperature for 30 minutes; thereafter, the autoclave was cooled down to 85° C. at a rate of 0.5° C./min with cooling water, and held at this temperature for 60 minutes; finally, the autoclave was cooled down to room temperature with cooling water. In the obtained solid-liquid mixture, were added 0.2 parts by weight of antioxidant 1010 and 0.2 parts by weight of antioxidant 168 as well as 0.6 parts by weight of nano calcium carbonate, and thereafter, the material was subjected to centrifugal separation and vacuum drying to obtain a polylactic acid resin powder suitable for selective laser sintering. As measured by a laser particle size analyzer, the polylactic acid resin powder obtained in this example has a particle size of 20-130 μm, and a particle size distribution of D10=34 μm, D50=61 μm, and D90=102 μm.

Example 2

100 parts by weight of poly-L-lactic acid resin and 1200 parts by weight of butanone were placed in an autoclave. A high-purity nitrogen gas was charged to 0.2 MPa; then the autoclave was heated up to 125° C., and kept at this temperature for 60 minutes; thereafter, the autoclave was cooled down to 90° C. at a rate of 0.5° C./min with cooling water, and held at this temperature for 60 minutes; further, the autoclave was cooled down to room temperature at a rate of 0.2° C./min. In the obtained solid-liquid mixture, were added 0.15 parts by weight of antioxidant 1010 and 0.15 parts by weight of antioxidant 168 as well as 0.8 parts by weight of sodium stearate, and thereafter, the material was subjected to centrifugal separation and vacuum drying to obtain a polylactic acid resin powder suitable for selective laser sintering. As measured by a laser particle size analyzer, the polylactic acid resin powder obtained in this example has a particle size of 45-115 μm, and a particle size distribution of D10=60 μm, D50=79 μm, and D90=100 μm.

Example 3

100 parts by weight of polylactic acid resin, including 50 parts by weight of L-polylactic acid resin and 50 parts by weight of D-polylactic acid resin, and 1000 parts by weight of acetone were placed in an autoclave. A high-purity nitrogen gas was charged to 0.2 MPa; then the autoclave was heated up to 130° C., and kept at this temperature for 60 minutes; thereafter, the autoclave was cooled down to 90° C. at a rate of 1.0° C./min with cooling water, and held at this temperature for 60 minutes; further, the autoclave was cooled down to room temperature at a rate of 1.0° C./min. In the obtained solid-liquid mixture, were added 0.25 parts by weight of antioxidant 1010 and 0.25 parts by weight of antioxidant 168 as well as 0.5 parts by weight of calcium stearate, and thereafter, the material was subjected to centrifugal separation and vacuum drying to obtain a polylactic acid resin powder suitable for selective laser sintering. As measured by a laser particle size analyzer, the polylactic acid resin powder obtained in this example has a particle size of 30-120 μm, and a particle size distribution of D10=44 μm, D50=76 μm, and D90=96 μm.

Example 4

100 parts by weight of polylactic acid resin, including 50 parts by weight of L-polylactic acid resin and 50 parts by weight of D-polylactic acid resin, and 800 parts by weight of 2-pentanone were placed in an autoclave. A high-purity nitrogen gas was charged to 0.3 MPa; then the autoclave was heated up to 140° C., and kept at this temperature for 30 minutes; thereafter, the autoclave was cooled down to 85° C. at a rate of 1.0° C./min with cooling water, and held at this temperature for 60 minutes; further, the autoclave was cooled down to 20° C. at a rate of 1.0° C./min, and held at this temperature for 60 minutes. In the obtained solid-liquid mixture, were added 0.25 parts by weight of antioxidant 1010 and 0.25 parts by weight of antioxidant 168 as well as 1 part by weight of zinc stearate, and thereafter, the material was subjected to centrifugal separation and vacuum drying to obtain a polylactic acid resin powder suitable for selective laser sintering. As measured by a laser particle size analyzer, the polylactic acid resin powder obtained in this example has a particle size of 35-130 μm, and a particle size distribution of D10=49 μm, D50=85 μm, and D90=111 μm.

Example 5

100 parts by weight of polyglycolide resin and 1000 parts by weight of dioxane were placed in an autoclave. A high-purity nitrogen gas was charged to 0.3 MPa; then the autoclave was heated up to 180° C., and kept at this temperature for 60 minutes; thereafter, the autoclave was cooled down to 120° C. at a rate of 1.0° C./min with cooling water, and held at this temperature for 60 minutes; further, the autoclave was cooled down to room temperature at a rate of 1.0° C./min. In the obtained solid-liquid mixture, were added 0.1 parts by weight of antioxidant 1010 and 0.1 parts by weight of antioxidant 168 as well as 0.75 parts by weight of nano-silica, and thereafter, the material was subjected to centrifugal separation and vacuum drying to obtain a polyglycolide resin powder suitable for selective laser sintering. As measured by a laser particle size analyzer, the polyglycolide resin powder obtained in this example has a particle size of 30-90 μm, and a particle size distribution of D10=40 μm, D50=52 μm, and D90=81 μm.

Example 6

100 parts by weight of poly(DL-lactide-co-glycolide) resin and 1200 parts by weight of dioxolane were placed in an autoclave. A high-purity nitrogen gas was charged to 0.2 MPa; then the autoclave was heated up to 120° C., and kept at this temperature for 60 minutes; thereafter, the autoclave was cooled down to 80° C. at a rate of 0.5° C./min with cooling water, and held at this temperature for 90 minutes; further, the autoclave was cooled down to room temperature at a rate of 0.2° C./min. In the obtained solid-liquid mixture, were added 0.15 parts by weight of antioxidant 1010 and 0.15 parts by weight of antioxidant 168 as well as 0.8 parts by weight of nano-barium sulfate, and thereafter, the material was subjected to centrifugal separation and vacuum drying to obtain a poly(DL-lactide-co-glycolide) resin powder suitable for selective laser sintering. As measured by a laser particle size analyzer, the poly(DL-lactide-co-glycolide) resin powder obtained in this example has a particle size of 45-150 μm, and a particle size distribution of D10=64 μm, D50=92 μm, and D90=128 μm.

Example 7

100 parts by weight of polybutylene succinate resin and 1200 parts by weight of acetone were placed in an autoclave. A high-purity nitrogen gas was charged to 0.1 MPa; then the autoclave was heated up to 100° C., and kept at this temperature for 120 minutes; thereafter, the autoclave was cooled down to room temperature at a rate of 0.1° C./min. In the obtained solid-liquid mixture, were added 0.1 parts by weight of antioxidant 1010 and 0.1 parts by weight of antioxidant 168 as well as 0.75 parts by weight of nano-silica, and thereafter, the material was subjected to centrifugal separation and vacuum drying to obtain a polybutylene succinate resin powder suitable for selective laser sintering. As measured by a laser particle size analyzer, the polybutylene succinate resin powder obtained in this example has a particle size of 30-94 μm, and a particle size distribution of D10=47 μm, D50=57 μm, and D90=78 μm.

Example 8

100 parts by weight of polycaprolactone resin and 400 parts by weight of tetrahydrofuran were placed in an autoclave. A high-purity nitrogen gas was charged to 0.2 MPa; then the autoclave was heated up to 70° C., and kept at this temperature for 60 minutes; thereafter, the autoclave was cooled down to room temperature at a rate of 0.5° C./min, and kept at this temperature for 60 minutes. In the obtained solid-liquid mixture, were added 0.2 parts by weight of antioxidant 1010 and 0.2 parts by weight of antioxidant 168 as well as 0.6 parts by weight of nano-calcium carbonate, and thereafter, the material was subjected to centrifugal separation and vacuum drying to obtain a polycaprolactone resin powder suitable for selective laser sintering. As measured by a laser particle size analyzer, the polycaprolactone resin powder obtained in this example has a particle size of 20-120 μm, and a particle size distribution of D10=30 μm, D50=65 μm, and D90=110 μm.

Example 9

100 parts by weight of polybutylene adipate resin and 400 parts by weight of cyclopentone were placed in an autoclave. A high-purity nitrogen gas was charged to 0.2 MPa; then the autoclave was heated up to 70° C., and kept at this temperature for 60 minutes; thereafter, the autoclave was cooled down to room temperature at a rate of 0.1° C./min, and kept at this temperature for 30 minutes. In the obtained solid-liquid mixture, were added 0.15 parts by weight of antioxidant 1010 and 0.15 parts by weight of antioxidant 168 as well as 0.8 parts by weight of sodium stearate, and thereafter, the material was subjected to centrifugal separation and vacuum drying to obtain a polybutylene adipate resin powder suitable for selective laser sintering. As measured by a laser particle size analyzer, the polybutylene adipate resin powder obtained in this example has a particle size of 45-140 μm, and a particle size distribution of D10=65 μm, D50=93 μm, and D90=122 μm.

Example 10

100 parts by weight of polybutylene succinate/adipate copolymer resin and 400 parts by weight of butanone were placed in an autoclave. A high-purity nitrogen gas was charged to 0.2 MPa; then the autoclave was heated up to 70° C., and kept at this temperature for 60 minutes; thereafter, the autoclave was cooled down to room temperature at a rate of 1° C./min, and kept at this temperature for 90 minutes. In the obtained solid-liquid mixture, were added 0.15 parts by weight of antioxidant 1010 and 0.15 parts by weight of antioxidant 168 as well as 0.8 parts by weight of sodium stearate, and thereafter, the material was subjected to centrifugal separation and vacuum drying to obtain a polybutylene succinate/adipate copolymer resin powder suitable for selective laser sintering. As measured by a laser particle size analyzer, the polybutylene succinate/adipate copolymer resin powder obtained in this example has a particle size of 25-92 µm, and a particle size distribution of D10=44 µm, D50=55 µm, and D90=71 µm.

Comparative Example 1

100 parts by weight of poly-L-lactic acid resin and 1000 parts by weight of chloroform were placed in an autoclave, and the poly-L-lactic acid resin was dissolved by leaving it at room temperature for 30 minutes without sealing. Subsequently, it was allowed to stand at room temperature for 60 minutes. Finally, a stable and uniform chloroform solution of poly-L-lactic acid resin was obtained. Poly-L-lactic acid resin powder could not be obtained.

Comparative Example 2

100 parts by weight of polyethylene terephthalate resin and 1000 parts by weight of acetone were placed in an autoclave. A high-purity nitrogen gas was charged to 0.2 MPa; then the autoclave was heated up to 120° C., and kept at this temperature for 30 minutes; thereafter, the autoclave was cooled down to 85° C. at a rate of 0.5° C./min with cooling water, and held at this temperature for 60 minutes; further, the autoclave was cooled down to room temperature with cooling water. A solid-liquid mixture was obtained, in which the shape of the solid did not change and was the original shape of the raw material of polyethylene terephthalate. Therefore, a well-proportioned polyethylene terephthalate resin powder with a uniform particle size distribution could not be obtained.

Comparative Example 3

100 parts by weight of poly-L-lactic acid resin and 1000 parts by weight of isophorone (boiling point 210° C., solubility parameter 18.6 MPa$^{0.5}$) were placed in an autoclave and heated to 120° C. without sealing, and the poly-L-lactic acid resin was dissolved by reflux. Thereafter, the autoclave was cooled down to 85° C. at a rate of 0.5° C./min with cooling water, and held at this temperature for 60 minutes; finally, the autoclave was cooled down to room temperature with cooling water. A stable and uniform isophorone solution of poly-L-lactic acid resin was obtained. Poly-L-lactic acid resin powder could not be obtained.

From the results of particle size analysis, the particle size distribution of the aliphatic polyester resin powder obtained according to the method of the present invention is relatively uniform. For aliphatic polyester resin material, a good effect is obtained by preparing aliphatic polyester resin powder for selective laser sintering according to the method of the present invention.

Although the present invention has been described in detail, modifications within the spirit and scope of the present invention will be apparent to those skilled in the art.

In addition, it should be understood that various aspects of the present invention described herein, various parts of different embodiments, and various features listed may be combined or totally or partially interchanged. In the respective embodiments described above, those embodiments that refer to another specific embodiment can be combined with other embodiments as appropriate, as will be understood by those skilled in the art. Moreover, those skilled in the art will understand that the foregoing description is by way of example only and is not intended to limit the present invention.

The invention claimed is:

1. A method for preparing an aliphatic polyester resin powder, comprising:
   a) heat dissolving a crystalline aliphatic polyester resin in an organic solvent to obtain an aliphatic polyester resin solution, wherein the crystalline aliphatic polyester is selected from polyesters formed by polymerizing $C_4$-$C_{12}$ aliphatic dicarboxylic acids and $C_2$-$C_{10}$ aliphatic diols, polyesters formed by polymerizing alpha-hydroxy $C_2$-$C_6$ carboxylic acids, polycaprolactone, and mixtures thereof;
   b) cooling the aliphatic polyester resin solution to precipitate a solid, thereby obtaining a solid-liquid mixture;
   c) optionally adding an adjuvant to the solid-liquid mixture; and
   d) conducting solid-liquid separation and drying to obtain an aliphatic polyester resin powder;
   wherein the organic solvent is a ketone or a cyclic ether, and
   has a solubility in the range of 10.0-25.0 MPa$^{0.5}$ and a boiling point not higher than 160° C. under atmospheric pressure.

2. The method according to claim 1, wherein the crystalline aliphatic polyester is selected from polyesters formed by polymerizing $C_4$-$C_{12}$ aliphatic dicarboxylic acids and $C_2$-$C_{10}$ aliphatic diols.

3. The method according to claim 1, wherein the crystalline aliphatic polyester is selected from crystalline polylactic acid, polyglycolide, poly(DL-lactide-co-glycolide), polyethylene succinate, polybutylene succinate, polybutylene adipate, polybutylene succinate/adipate copolymer, polycaprolactone, and mixtures thereof.

4. The method according to claim 1, wherein the aliphatic polyester is a crystalline polylactic acid, or a mixture of L-polylactic acid resin and D-polylactic acid resin.

5. The method according to claim 1, wherein the organic solvent is selected from $C_3$-$C_{10}$ ketone solvents, $C_3$-$C_{10}$ cyclic ether solvents, $C_3$-$C_5$ ketone solvents, and $C_3$-$C_5$ cyclic ether solvents, acetone, butanone, 2-pentanone, 3-pentanone, cyclopentanone, methylisopropyl ketone, tetrahydrofuran, dioxane, dioxolane, and mixtures thereof.

6. The method according to claim 1, wherein the organic solvent is in an amount of 600 to 1200 parts by weight, based on 100 parts by weight of the aliphatic polyester resin.

7. The method according to claim 1, which is characterized in that, in step a), the aliphatic polyester resin is maintained at a temperature of 60-200° C. for 30-90 minutes.

8. The method according to claim 1, wherein, in step b), the crystalline aliphatic polyester resin solution is cooled down to a target temperature at an average cooling rate of 0.1° C./min to 1° C./min.

9. The method according to claim 1, wherein, in step b), the crystalline aliphatic polyester resin solution is cooled to a target temperature via one or more intermediate temperatures in the range of 40-100° C. and held at said one or more intermediate temperatures for 30-90 minutes.

10. The method according to claim 1, further comprising adding a nucleating agent in the aliphatic polyester resin solution in step a), wherein the nucleating agent is selected from silica, calcium oxide, calcium carbonate, barium sulfate, hydrotalcite, talc, carbon black, kaolin, mica, and mixtures thereof.

11. The method according to claim 10, wherein the nucleating agent is in an amount of 0.01-2 parts by weight, based on 100 parts by weight of the crystalline aliphatic polyester resin.

12. The method according to claim 1, wherein the adjuvant in step c) is selected from antioxidants, powder release agents, antistatic agents, antibacterial agents, and glass fiber reinforcements.

13. The method according to claim 12, wherein the adjuvant is antioxidant 1010, antioxidant 168, or a mixture thereof, and the adjuvant is in an amount of 0.1-0.5 parts by weight, based on 100 parts by weight of the crystalline aliphatic polyester resin.

14. The method according to claim 12, wherein the adjuvant is a powder release agent selected from an alkali or alkaline earth metal based on alkane monocarboxylic or dimer acids, a nano-oxide, a nano-metal salt, sodium stearate, potassium stearate, zinc stearate, calcium stearate, lead stearate, silica, titanium dioxide, aluminum oxide, zinc oxide, zirconium oxide, calcium carbonate, barium sulfate, and mixtures thereof; and the powder release agent is in an amount of 0.01-10 parts by weight, based on 100 parts by weight of the crystalline aliphatic polyester resin.

15. A crystalline aliphatic polyester resin powder prepared by the method according to claim 1, having a particle shape of spherical and/or spheroidal, a particle size of 25-150 μm, and a particle size distribution in which D10=24-64 μm, D50=48-95 μm, and D90=71-128 μm.

16. A selective laser sintering method, comprising sintering the crystalline aliphatic polyester resin powder prepared by the method according to claim 1.

17. A method of manufacturing a three-dimensional object, comprising selective laser sintering the crystalline aliphatic polyester resin powder prepared by the method according to claim 1.

18. The method according to claim 1, wherein the ketone or the cyclic ether has a solubility in the range of 14.5-23.0 $MPa^{0.5}$ and a boiling point not higher than 150° C. under atmospheric pressure.

19. The method according to claim 1, wherein the ketone or the cyclic ether has a solubility in the range of 18.5-20.5 $MPa^{0.5}$ and a boiling point not higher than 100° C. under atmospheric pressure.

20. The method according to claim 4, wherein a weight ratio between L-polylactic acid resin and D-polylactic acid resin in the mixture is about 1:1.

21. The method according to claim 5, wherein the organic solvent is selected from acetone, butanone, 2-pentanone, 3-pentanone, cyclopentanone, methylisopropyl ketone, tetrahydrofuran, dioxane, dioxolane, and mixtures thereof.

22. The method according to claim 6, wherein the organic solvent is in the amount of 800 to 1000 parts by weight.

23. The method of claim 7, wherein the aliphatic polyester resin is maintained at a temperature of 70-190° C.

24. The method of claim 7, wherein the aliphatic polyester resin is maintained at a temperature of 80-160° C.

25. The method according to claim 8, wherein, in step b), the crystalline aliphatic polyester resin solution is held for 30-90 minutes at the target temperature of 10-30° C.

26. The method according to claim 9, wherein said one or more intermediate temperatures are in the range of 50-90° C.

27. The method according to claim 11, wherein the amount of the nucleating agent is 0.1-0.5 parts by weight.

28. The method of claim 12, wherein the amount of the adjuvant is 0.2-0.4 parts by weight.

29. The method of claim 14, wherein the amount of the powder release agent is 0.1-5 parts by weight.

30. The method of claim 14, wherein the amount of the powder release agent is 0.5-1 parts by weight.

* * * * *